Figure 1:
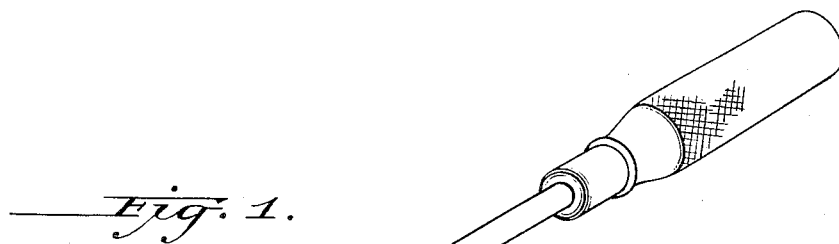

March 6, 1934.   E. SCHENK   1,949,763

SCREW DRIVER

Filed Aug. 17, 1932

INVENTOR
ERICH SCHENK
BY Charles J Holland
ATTORNEY

Patented Mar. 6, 1934

1,949,763

UNITED STATES PATENT OFFICE 1,949,763

SCREW DRIVER

Erich Schenk, New York, N. Y.

Application August 17, 1932, Serial No. 629,137

2 Claims. (Cl. 145—50)

The present invention relates to kerf-engaging tools, such as a screw driver, and more particularly to a screw driver attachment adapted to drive a screw into a tap hole located at a position which is remote from the operator or difficultly accessible. The device of the invention may be and preferably is provided as an attachment for a screw driver of the ordinary sort or which may be fitted to a shank of any suitable kind which is either itself of extraordinary length or is of such a nature that it may be combined or joined with other suitable instruments of similar sort to reach to the remote difficultly accessible position where the screw is to be driven. On the other hand, the device may be built into the shank as an integral part, regardless of the length of the shank.

The mechanic often finds it extremely difficult to insert a screw into the threaded tap hole for which it was designed. Of course, this is a simple operation when the hole is at or adjacent to the outer surface of the work-piece, but it often happens that various parts of the apparatus are so disposed that it is difficult, if not impossible, to place the fingers or hand in sufficiently close proximity to the hole that the screw may be held thereon preparatory to turning it and intermeshing the threads so that the screw may properly make its initial entry.

In order to overcome the above mentioned difficulties, various types of devices have been proposed to enable a screw to be held by the end of a screw driver and thus eliminate the necessity of gaining access to the hole in which the screw is to be inserted, with the fingers or hand. Some of these devices have been arranged so that they are operable only by making various adjustments upon the instrumentalities which have been incorporated in them, while others, though more simply constructed, have been found not to exert a sufficiently strong grip upon the screw either in holding it in place or in turning it into the tap hole. Again, magnetized screw driver blades have been constructed in order to overcome the difficulties of constructing a sufficiently simple and strong mechanical arrangement. This type of device has, however, not proved to be satisfactory as it is not applicable for use with screws which cannot be magnetized, and in addition the blades of such devices rapidly lose their magnetism.

The present invention has provided a screw driver arrangement which combines the attributes of simplicity with those of strength and which overcomes the disadvantages which have been confronted in the construction of prior devices designed for the same general purpose.

The advantages of the present invention will be readily perceived when reference is had to the following specification and drawing.

Figure 2:
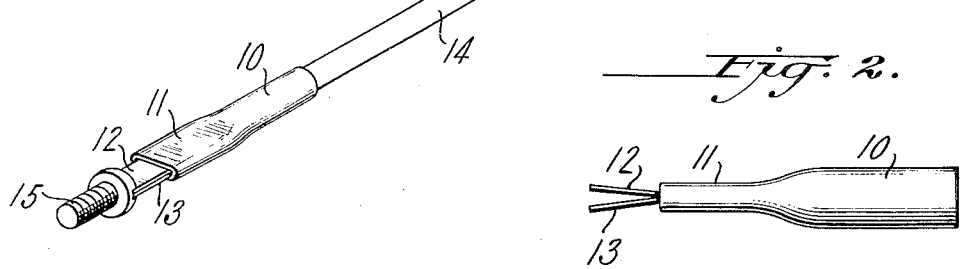
Figure 3:
Figure 4:
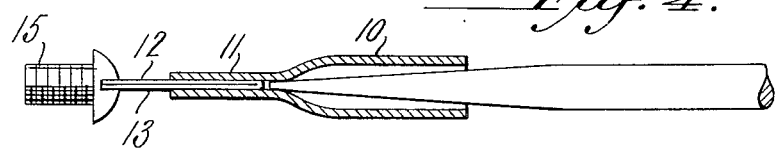
Figure 5:
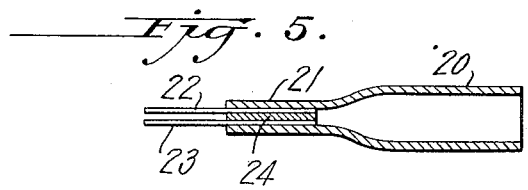

In the drawing, Fig. 1 is a perspective view of an attachment embodying the principles of the present invention when assembled for use with a screw driver; Fig. 2 is a side elevation of the device shown in perspective in Fig. 1; Figs. 3 and 4 are plan and elevational views, partly in section, of the device of Fig. 2, showing the relation of the blade of a screw driver thereto; Fig. 5 is another view, partly in section, of a modification of the device shown in the previous figures.

The invention may be satisfactorily accomplished by a simple construction embodying a hollow tube 10, preferably of metal, one end of which is adapted to house the blade of a screw driver 14 while the other end is squeezed together and constricted in order to grip tightly the opposed, relatively short, resilient, substantially flat members 12 and 13. Although the member 10 is shown in the drawing as a substantially round tube, it is to be understood that this member may be of any shape adapted to hold the members 12 and 13 and to hold a blade such as that of a screw driver, chisel or suitable turning instrument. The members 12 and 13 are preferably made of spring steel and possess considerable resiliency when bent in a direction normal to their flat surfaces; these members, however, should be thick enough and short enough so that they will withstand torsional stresses, as those caused by turning a screw, without appreciable deformation, that is, so that they will remain substantially rigid when subjected to these stresses. These flat members may be normally curved so that their outer ends are separated from one another and so that they may be squeezed together against their own tendency to spring apart and placed in the kerf of a screw or plug 15, as illustrated in Figs. 1 and 4. When so positioned, the members 12 and 13 tend to spring outwardly and exert a strong frictional contact against the sides of the kerf of the screw, thus firmly holding it in position preparatory to the insertion of the screw in the tap hole.

The members 12 and 13 are preferably constructed of two pieces of spring metal but may also be made of a single piece as indicated in Fig. 4. This unitary construction enhances the strength of the device and reduces the liability of displacement of the flat members from the position in which they are clasped. The surfaces of these members may be roughened at their inner ends, if desired, in order to insure a rigid attachment to the contacting or holding positions 11 of the holder 10.

In order to enable the device to be firmly gripped by an actuating blade such as the blade of a screw driver 14, the members 12 and 13 are preferably terminated short of the total length of the squeezed-together portion of the tubular member 10. This construction is clearly illustrated in Figs. 3 and 4 and it will be seen that the blade of the screw driver is thus enabled to be seated in that portion of the tubular member 10 where its sides become constricted. In this simple manner, the device may be positively gripped and turned by the screw driver, which may be readily inserted and withdrawn into and from the open end of the holder 10.

Fig. 5 exemplifies a modification of the device adapted and arranged for use with screws or similar instruments in which the kerf is of extraordinary width. In this figure, a tubular member 20 is constricted at 21 in order to clasp the flat metallic strips 22 and 23 between which is disposed a shim 24. It will be seen that such a construction results in the opposed ends of the flat members 22 and 23 being normally disposed at a distance substantially greater than the width of the kerf. The flat members 22 and 23, which are, preferably, of spring metal, may, if desired, be sprung outwardly so as to give additional grip or force on the kerf of the screw. Also, to produce the same effect, instead of using a shim for the purpose described, a single strip of spring metal of sufficient length may be used, the members 22 and 23 being of length similar to that shown in the drawing but the surplus of the strip being folded back and forth on itself within the constricted portion 21 of the holder 20 sufficiently to effect the desired separation between the flat strips 22 and 23.

The invention is, of course, applicable for use with wood screws and in such case enables the insertion of such screws in soft wood without the necessity of first drilling a hole.

What I claim is:

1. A tool comprising a tubular member open at one end and adapted to house and firmly to secure against turning therein the blade of a screw driver, a flat metallic member doubled upon itself and having its free ends separated, said flat member being rigidly attached to the other end of said tubular member, the outer ends of said flat member being adapted to be sprung inwardly toward one another.

2. A kerf-engaging tool comprising a hollow metallic tubular member having one end adapted to house the blade of a screw driver and having its other end squeezed together rigidly to hold a pair of flat members, the inner end of the squeezed-together portion being adapted firmly to seat the tip of the screw driver blade.

ERICH SCHENK.